(12) United States Patent
Thomas

(10) Patent No.: US 6,474,656 B1
(45) Date of Patent: Nov. 5, 2002

(54) POWER DRIVABLE CHUCK

(75) Inventor: Rickey J. Thomas, Lineboro, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/621,082

(22) Filed: Jul. 21, 2000

Related U.S. Application Data
(60) Provisional application No. 60/144,825, filed on Jul. 21, 1999.

(51) Int. Cl.⁷ ............................................. B23B 31/107
(52) U.S. Cl. ............................ 279/30; 81/438; 279/80; 279/97; 279/905; 408/226; 408/239 R
(58) Field of Search .................... 408/226, 239 R, 408/240; 279/22, 23.1, 29, 30, 76, 79, 80, 97, 904, 905, 143–145; 403/375; 83/698.91, 699.11; 81/438, 439

(56) References Cited

U.S. PATENT DOCUMENTS

| | | |
|---|---|---|
| 751,345 A | 2/1904 | Saunders |
| 1,138,465 A | 5/1915 | Fegley et al. |
| 1,862,623 A | 6/1932 | Harrington |
| 2,138,253 A | 11/1938 | Lynch |
| 2,270,840 A | 1/1942 | Allen |
| 2,390,950 A * | 12/1945 | Lanfranconi ............... 408/226 |
| 3,156,479 A | 11/1964 | Drazick |
| 3,943,986 A * | 3/1976 | Ljdegard .................... 408/226 |
| D245,395 S * | 8/1977 | Cognevich .................. 279/144 |
| 4,234,201 A * | 11/1980 | Sorensen .................... 279/77 |
| 4,449,559 A * | 5/1984 | Martinmaas ................ 81/438 |
| 4,629,375 A | 12/1986 | Lieser |
| 5,340,245 A | 8/1994 | Bloechle et al. |
| 5,398,946 A | 3/1995 | Quiring |
| 5,833,405 A * | 11/1998 | Nielsen ...................... 408/226 |
| 6,053,675 A * | 4/2000 | Holland et al. ......... 408/239 R |
| 6,390,739 B1 * | 5/2002 | O'Banion ................... 408/226 |

FOREIGN PATENT DOCUMENTS

| | | | | |
|---|---|---|---|---|
| DE | 4316799 A1 * | 7/1994 | ............ | B23G/5/06 |
| GB | 2286351 | 8/1995 | | |

* cited by examiner

*Primary Examiner*—Steven C. Bishop
(74) *Attorney, Agent, or Firm*—Charles E. Yocum; John D. Del Ponti

(57) ABSTRACT

A power drivable chuck 30 includes a body 72 which is formed with a shank-receiving opening 34 having a triangular cross section. A spring 104 is located about a forward section 78 of the body 72, and is captured within a chamber 102 between a base surface 98 of a sleeve 76 and a forward surface 100 of an intermediate section 80 of the body. A ball 90 is located in a passage 86 formed through the body 72 from an exterior surface 96 to the opening 34. A pair of slots 106 and 108 are also formed in the body in communication, and aligned, with the passage 86 on opposite sides of the passage. The ball 90 is formed with a through hole 112 and receives a pin 114 therein, with opposite ends of the pin extending from the ball and into respective ones of the slots 106 and 108. The spring 104 engages and normally urges the opposite ends of the pin 114 against the base surface 98 of the sleeve 76 normally to extend a portion 90*a* of the ball 90 into the opening 34 for locking a shank 42 within the opening. The opening 34 is formed to receive a hexagonal shank 38 and triangular shanks 44 and 52.

24 Claims, 8 Drawing Sheets

US 6,474,656 B1

POWER DRIVABLE CHUCK

This application claims the benefit of provisional application No. 60/144,825 filed on Jul. 21, 1999.

BACKGROUND OF THE INVENTION

This invention relates to a power drivable chuck, and particularly relates to a power drivable chuck having a triangular shank-receiving bore, and to an accessory having a triangular shank for assembly with the chuck.

In the past, chucks have been designed to receive shanks of various cross sections. Such cross sections generally have included hexagonal and round configurations. The manufacture of chucks which accommodate hexagonal shanks is a somewhat costly effort considering that a bore of the chuck is typically machined with five walls. Other wall configurations also have been designed which accommodate a hexagonal shank as well as other shank configurations. However, such other wall configurations are complex and also costly to manufacture.

Thus, there is a need for a chuck which is economical and relatively easy to manufacture, while also providing facility for receipt of shanks of different configurations.

In addition, there is a need for an accessory, such as, for example, a drill bit, having a shank which is economical and easy to manufacture, which can be accommodated by the above-noted economical and easy-to-manufacture chuck.

In some chucks, a locking element, such as, for example, a ball, has a biasing force applied directly thereto, for urging the locking element into a position to lock a shank within a bore of the chuck. With the constant direct application of the biasing force upon the locking element, a loss of structural integrity could result, which could have a undesirable effect upon the operation of the locking feature of the chuck.

Thus, there is a need for a providing a locking element within a chuck which is not subject to a directly applied biasing force.

SUMMARY OF THE INVENTION

It is, therefore, an object of this invention to provide a chuck which is economical and relatively easier to manufacture, while also providing facility for receipt of shanks of different configurations.

Another object of this invention is to provide a shank which is economical and easier to manufacture.

Still another object of this invention is to provide a chuck having a locking element which is not subject to a directly applied biasing force.

With these and other objects in mind, this invention contemplates a power drivable chuck for receiving and clamping a shank having a cross section selected from the group consisting of a triangular cross section configuration and a hexagonal cross section configuration. The chuck includes a body having a front face and a shank-receiving bore formed in the front face of the body and extending into the body from the front face. The bore is formed with three angularly interfacing surfaces arranged to drivingly engage the shank. Means are provided for locking the shank with the chuck.

This invention further contemplates a power drivable chuck for receiving and clamping a shank, and includes a body having a shank-receiving bore formed therein and an exterior surface. A passage is formed in the body and extends from the exterior surface to the bore. A locking element is movable within the passage and has a portion thereof which is extendable into the bore. An extension element is assembled with and extends from the locking element. Means are provided for normally urging the extension element, and thereby the locking element, into a position whereby the portion of the locking element extends normally into the bore.

This invention also contemplates an accessory which includes a shank formed in a triangular cross section.

Other objects, features and advantages of the present invention will become more fully apparent from the following detailed description of the preferred embodiment, the appended claims and the accompanying drawings.

DETAILED DESCRIPTION OF THE PREFERRED EMBODIMENTS

Figure 1:
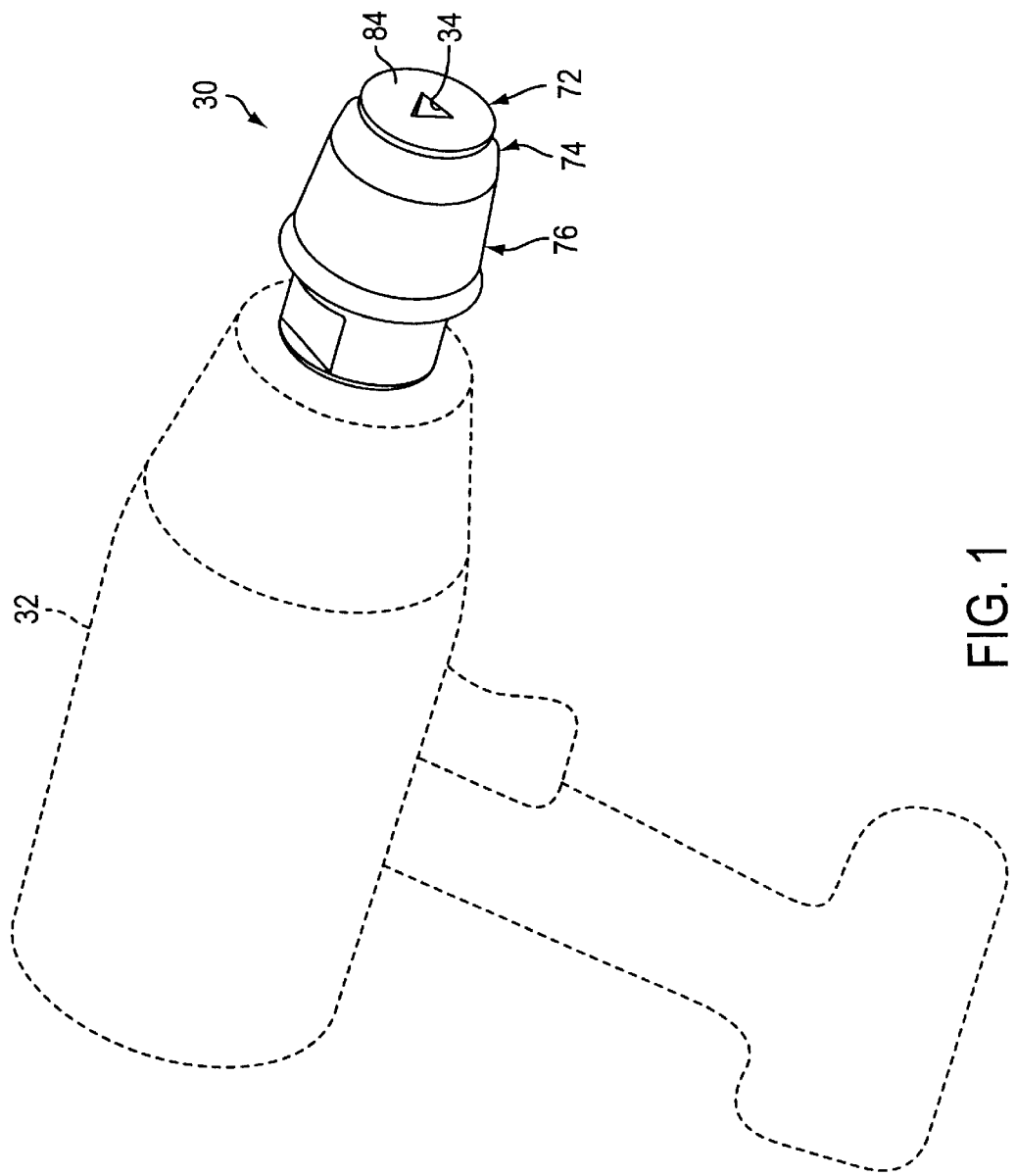
FIG. 1 is a perspective view showing a chuck in accordance with certain principles of the invention, mounted on a drill.
Figure 4:
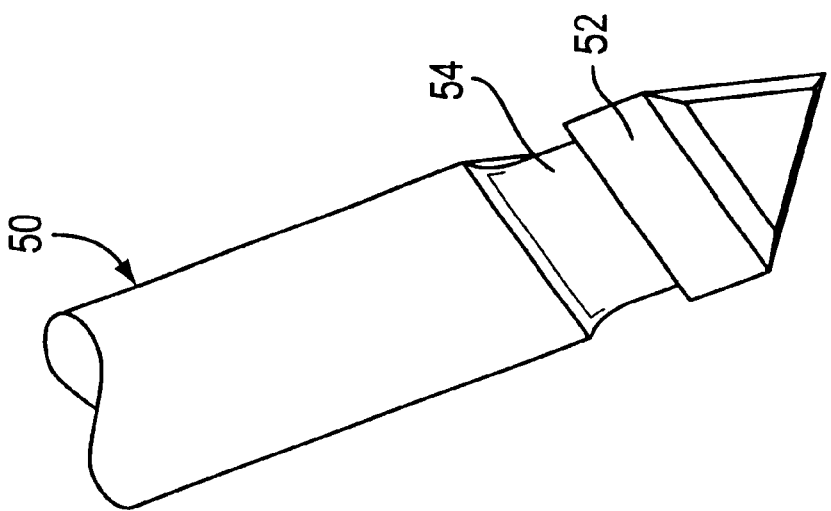
FIG. 4 is a perspective view showing a shank having a triangular cross section in accordance with certain principles of the invention.
Figure 3:
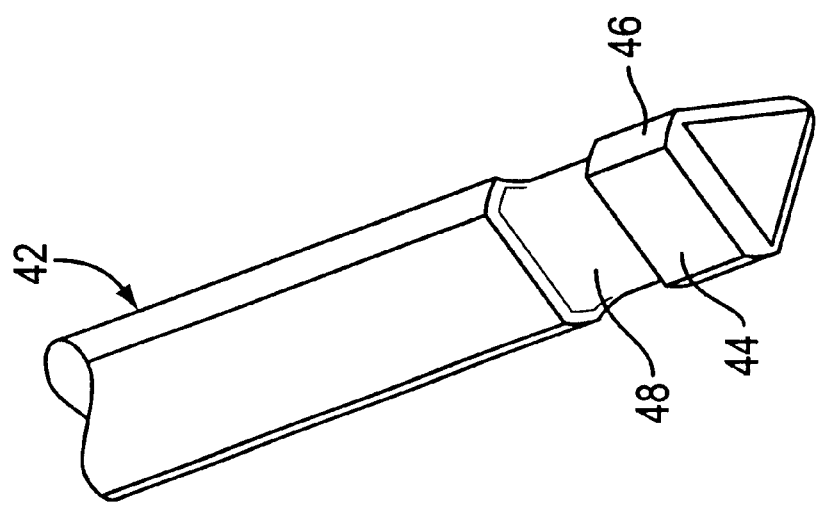
FIG. 3 is a perspective view showing a shank having a triangular cross section in accordance with certain principles of the invention.
Figure 2:
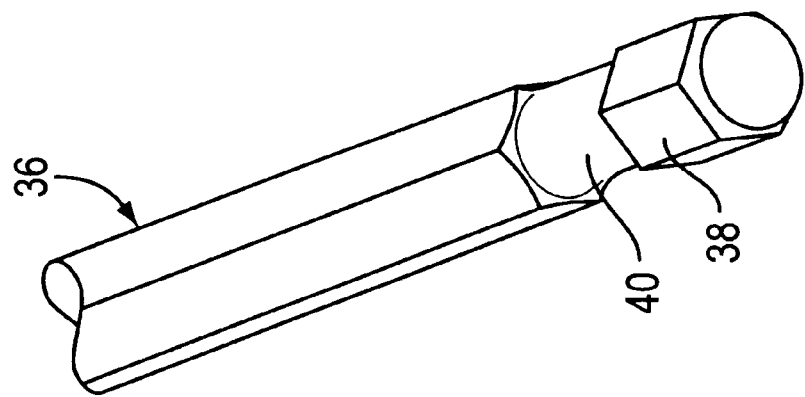
FIG. 2 is a perspective view showing a hexagonal shank.

Referring to FIG. 1, a chuck 30 can be coupled to a power driver such as, for example, a drill 32, shown in phantom, for rotating the chuck. The chuck 30 is designed with a triangular shaped shank-receiving opening or bore 34 for receiving and locking differently configured shanks of a plurality of accessories, including, for example, (1) a bit 36 (FIG. 2) having a hexagonal shank 38, with a groove 40, (2) a bit 42 (FIG. 3) having a triangular cross-sectioned shank 44 formed with slightly convex surfaces 46 (FIG. 12) at corners of the triangular cross section, and with a groove 48, and (3) a bit 50 (FIG. 4) having a triangular cross-sectioned shank 52, with a groove 54.

The shanks 38, 44 and 52 of the three bits 36, 42 and 50, respectively, may also be received and gripped by chucks having other shank-receiving openings such as, for example, the illustrated front-face openings 56, 58, 60 and 62 of chucks 64, 66, 68 and 70, respectively, as shown in FIGS. 8, 9, 10 and 11, respectively. The shanks 38, 44 and 52 may also be received in the various shank-receiving openings of the chucks disclosed in a now abandoned patent application identified by U.S. Ser. No. 60/108,336, filed on Nov. 13, 1998, and its successor pending nonprovisional patent application identified by U.S. Ser. No. 09/439,505, filed on Nov. 12, 1999, the disclosures of which are incorporated herein by reference thereto.

Figure 14:
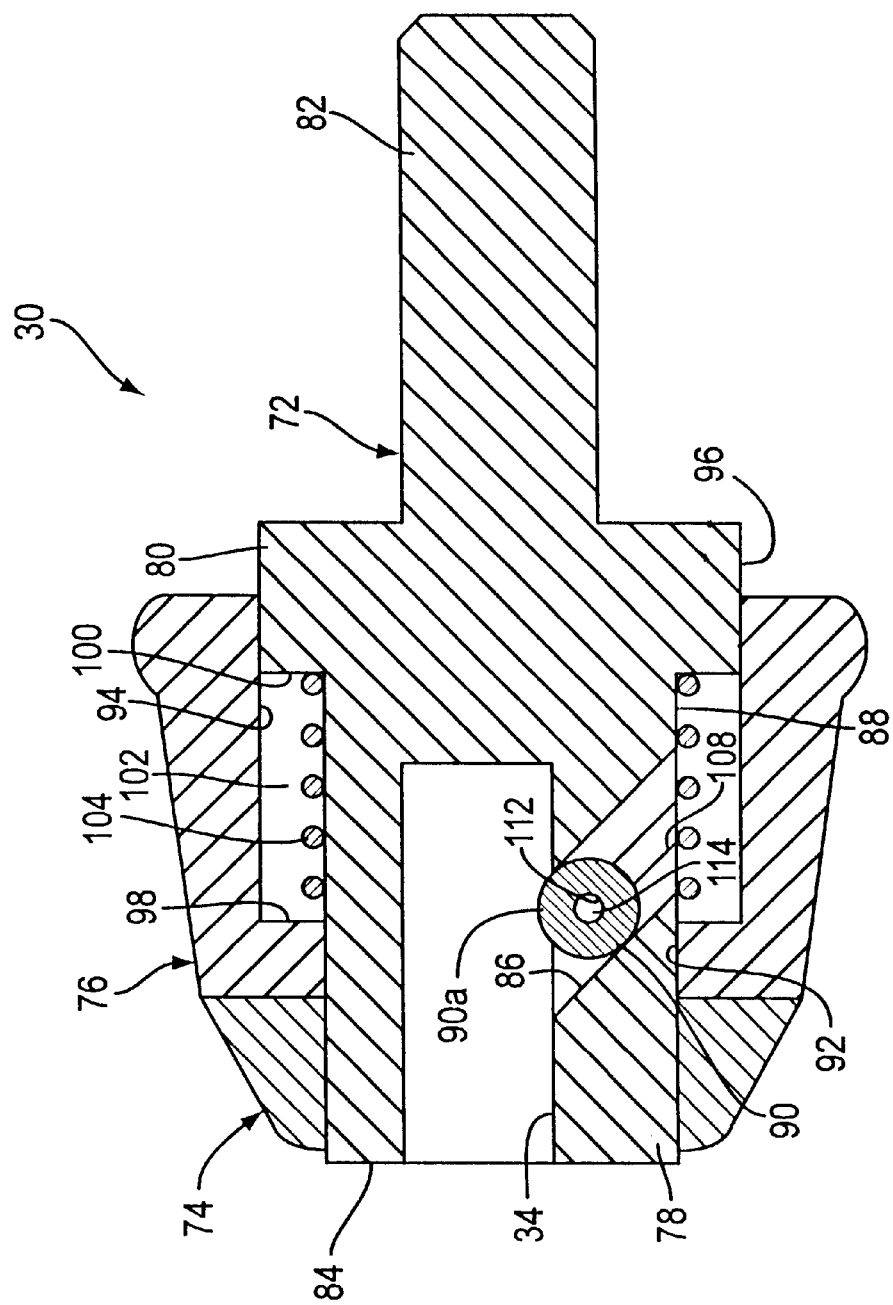
FIG. 14 is a sectional view showing the chuck of FIG. 1 with the locking element of FIG. 5 biased partially into the bore of the chuck in accordance with certain principles of the invention.

Referring to FIG. 14, the chuck 30 includes a chuck body 72, an end cap 74 and a sleeve 76. The chuck body 72 is formed integrally in three sections identified as a forward section 78 having a first exterior diameter, an intermediate section 80 having a second exterior diameter greater than the first diameter, and a rearward section 82 having a third exterior diameter less than the first diameter. The shank-receiving opening 34 is formed axially in the forward section 78 from a front face 84 thereof for a distance equal to about three-fourths of the axial length of the forward section.

A passage 86 is formed through the forward section 78 between an exterior peripheral surface 88 thereof and into communication with the opening 34. The passage 86 is formed at an angle relative to the axis of the chuck 30 and extends from the juncture thereof with the peripheral surface 88, toward the axis and the front face 84. The passage 86 is sized to receive a ball 90 for movement therein.

The sleeve 76 is formed with a bore 92 which is located about the peripheral surface 88 of the body 72 to allow axial movement of the sleeve relative to the body. The sleeve 76 is formed with a counterbore 94, portions of which are located about an exterior peripheral surface 96 of the intermediate section 80 for axial movement relative thereto. A counterbore base surface 98 is formed in the sleeve 76 and, together with the counterbore 94, the peripheral surface 88 and a forward surface 100 of the intermediate section 80, defines an enclosed chamber 102 for receipt of a spring 104. The end cap 74 is press fit onto a forward portion of the peripheral surface 88 of the body 72, whereby the sleeve 76 is captured in the assembled arrangement, as illustrated, but can be moved axially relative to the body for a limited axial distance.

The rearward section 82 of the body 72 forms a stem or shank which can be assembled and gripped within the drill 32 to facilitate rotation of the chuck 30 when the drill is operated. Alternatively, the rearward section 82 could be formed with a threaded axial bore from the rear thereof to facilitate the mounting of the chuck 30 onto a threaded spindle of the drill 32.

Figure 5:
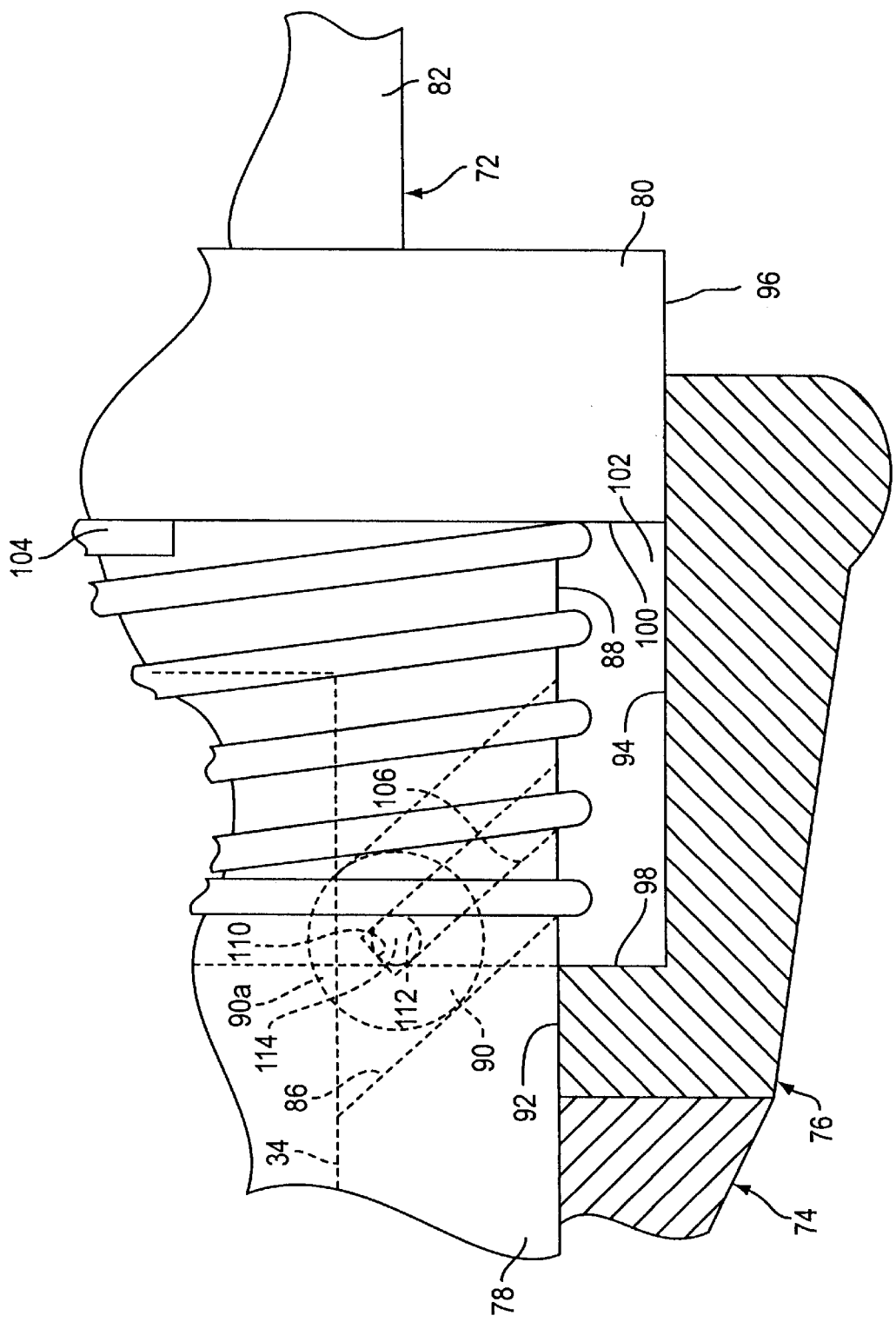
FIG. 5 is a partial sectional view of a body, sleeve, spring and locking element of the chuck of FIG. 1, in accordance with certain principles of the invention.
Figure 6:
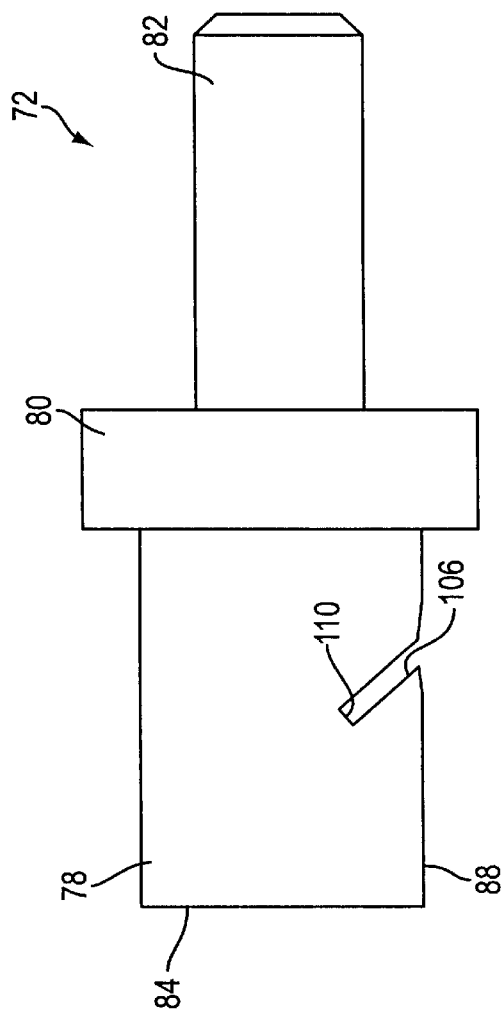
FIG. 6 is a side view showing the body of FIG. 5 in accordance with certain principles of the invention.
Figure 7:
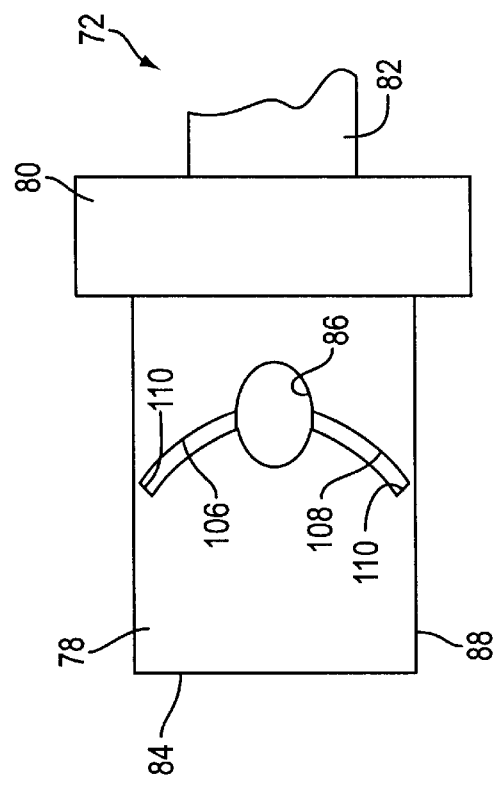
FIG. 7 is a plan view showing the body of FIG. 5 in accordance with certain principles of the invention.
Figure 8:
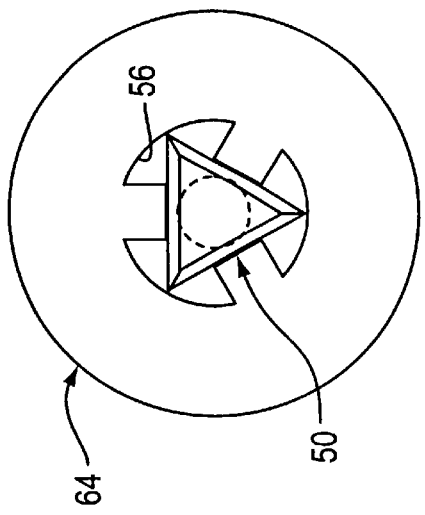
FIG. 8 is a front view showing the front face of a chuck having a bore configuration in accordance with certain principles of the invention.
Figure 9:
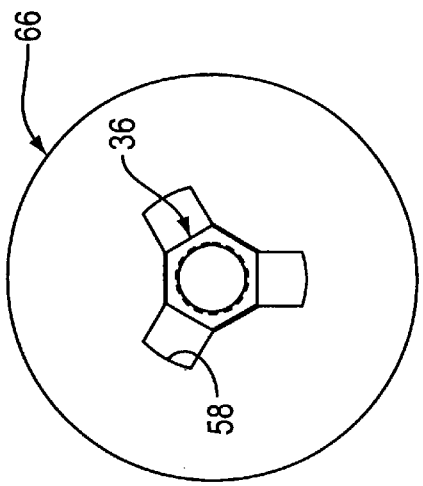
FIG. 9 is a front view showing the front face of a chuck having a bore configuration in accordance with certain principles of the invention.
Figure 10:
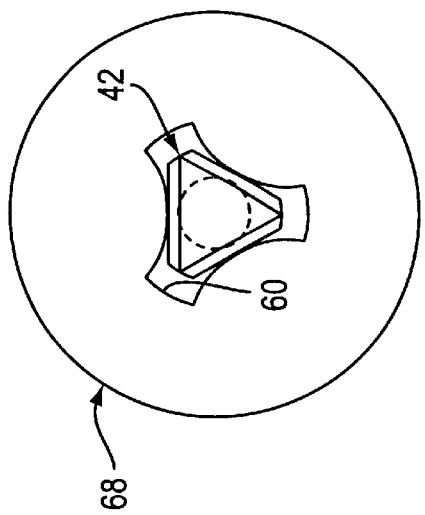
FIG. 10 is a front view showing the front face of a chuck having a bore configuration in accordance with certain principles of the invention.
Figure 11:
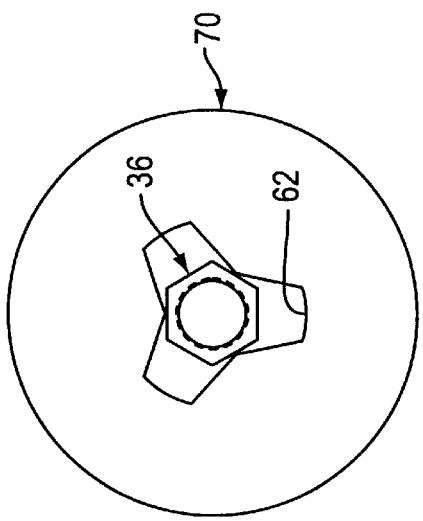
FIG. 11 is a front view showing the front face of a chuck having a bore configuration in accordance with certain principles of the invention.

Referring to FIG. 7, two interfacing, spaced slots 106 and 108 are formed in opposite wall portions of the passage 86. Each of the slots 106 and 108 extend from the opening of the passage 86, which is contiguous with the peripheral surface 88 of the chuck body 72, to a squared floor 110, near the juncture of the passage with the opening 34. As shown in FIG. 5, a forward corner of the squared floor 110 of each of the slots 106 and 108 slightly overlaps the counterbore base surface 98 of the sleeve 76. As shown in FIG. 6, the slots, represented in the figure by the slot 106 is formed at the same forward, axially-directed angle as the passage 86.

Figure 13:
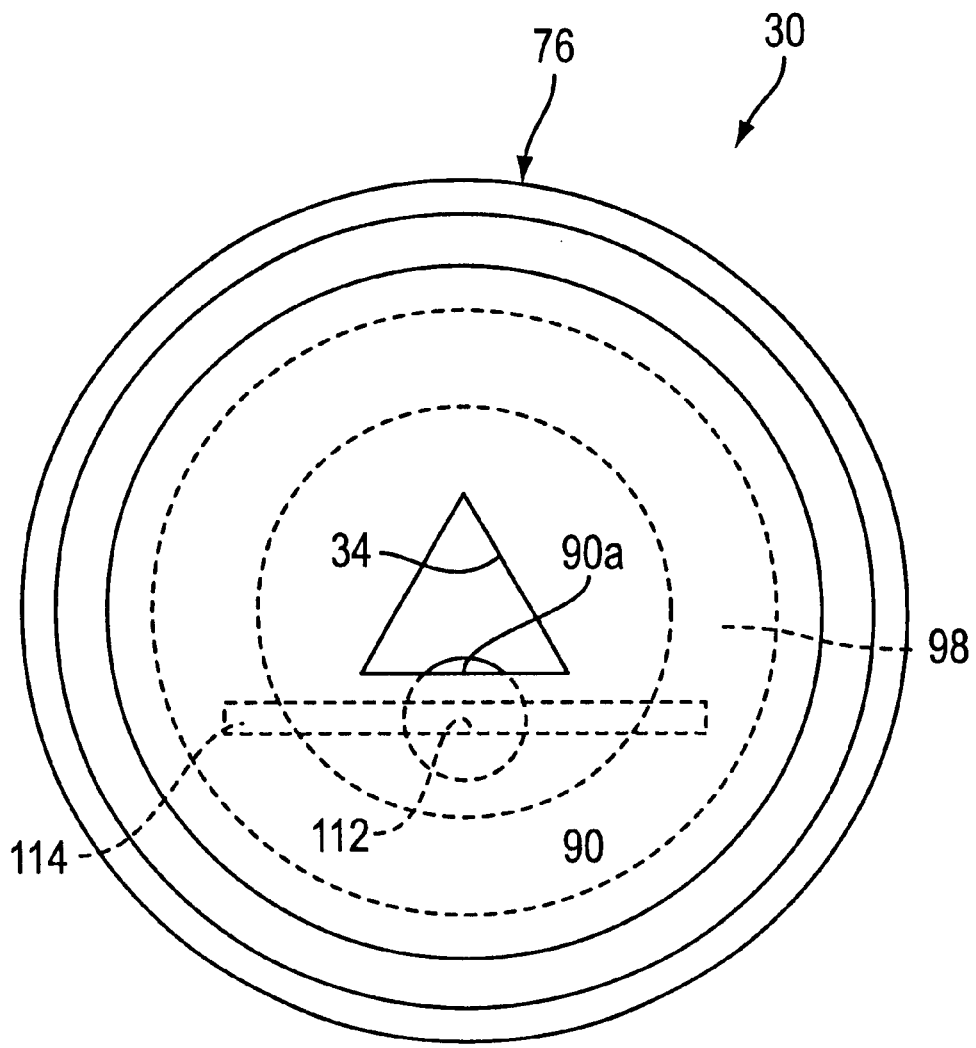
FIG. 13 is a front view showing a front face of the chuck of FIG. 1 in conjunction with the locking element of FIG. 5, in accordance with certain principles of the invention.

Referring to FIGS. 5, 13 and 14, the ball 90 is formed with a through hole 112 for receiving an intermediate portion of a pin 114, which extends from opposite sides of the ball by equal distances. As shown in FIG. 13, opposite ends of the pin 114 extend to a location where the ends overlap the base surface 98 and, as illustrated in FIG. 5, are also located in the floor 110 of the slots 106 and 108 when the ball 90 is positioned so that a small portion 90a of the ball extends into the opening 34. In this position, the spring 104 is resting on the adjacent portions of the pin 114 to normally urge the pin into engagement with the floor 110 of each of the slots 106 and 108, and into engagement with adjacent portions of base surface 98 of the sleeve 76. This provides a means for normally urging the ball 90 into a position where the portion 90a of the ball extends into the opening 34.

When using the chuck 30, an operator inserts, for example, the rearward end of the shank 52 (FIG. 4) of the bit 50 into the triangular opening 34 of the chuck. Upon continued insertion movement of the bit 50, the rearward end of the shank 52 engages a means for locking the shank with the chuck 30, including the ball 90 and the portion 90a thereof, and urges the ball fully into the passage 86, which allows continued insertion movement of the bit. Eventually, the groove 54 of the bit 50 becomes aligned with the passage 86 and the biasing force of the compressed spring 104 urges the ball 90, as a locking element, further into the passage whereby the portion 90a enters the groove 54 to effectively lock the bit 50 with chuck 30 through the action of the means for locking.

In order to remove the bit 50 from the chuck 30, the operator retracts the sleeve 76, whereby the base surface 98 of the sleeve is moved rearward of the chuck to move the ends of the pin 114 angularly rearward within the slots 106 and 108. Eventually, upon the angularly rearward movement of the ball 90, the portion 90a thereof is withdrawn into the passage 86 and the bit 50 can now be removed from the chuck 30.

Figure 12:
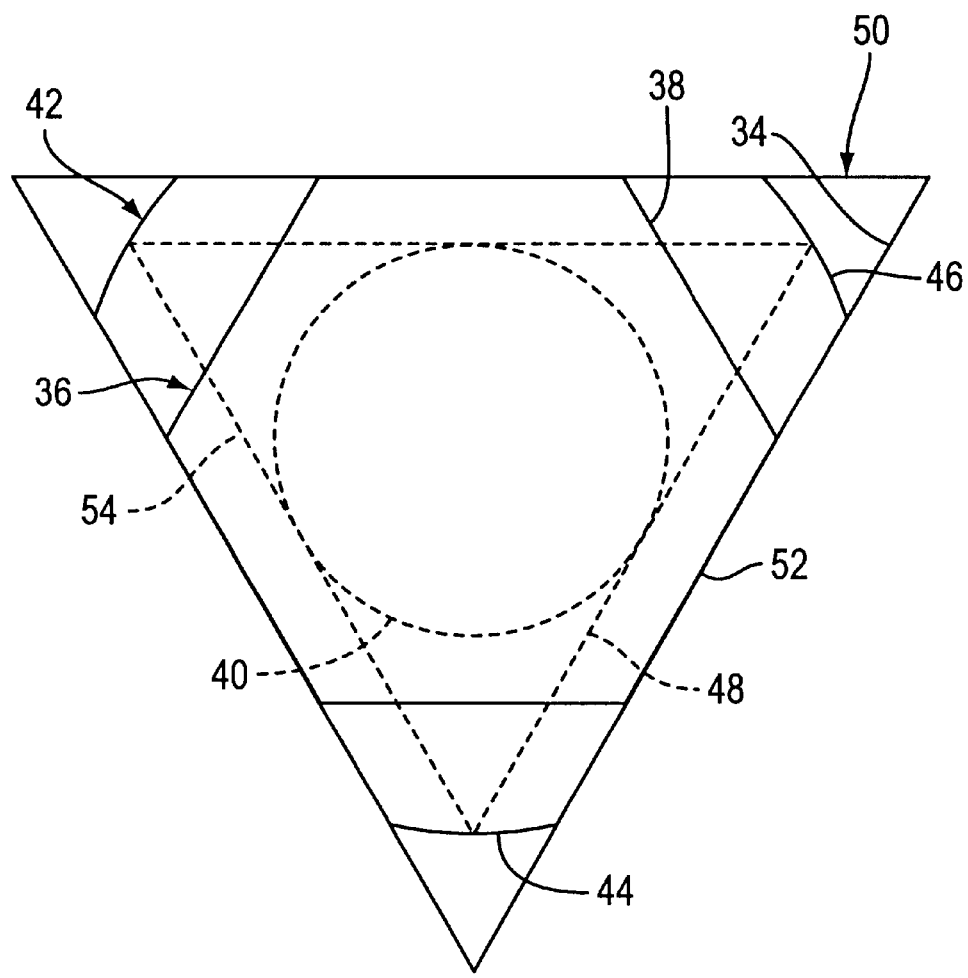
FIG. 12 is a diagrammatical view showing a triangle representative of a bore opening of the chuck of FIG. 1 with end view representations of the shanks of FIGS. 3 and 4, in accordance with certain principles of the invention.

Referring to FIG. 12, a solid line triangle forms the perimeter of the figure and represents the triangular opening 34 of the chuck 30, on the one hand, and also represents the triangular shank 52 (FIG. 4) of the bit 50, on the other hand, with the shank being inserted into the opening. The dashed line triangle within the solid line triangle represents the groove 54 of the bit 50.

Major portions of the solid line triangle also represent the shank 44 (FIG. 3) of the bit 42, with the convex surfaces 46 also being shown, all of which are located with the opening 34. The dashed line triangle also represents the groove 48 of the bit 42.

Further, three solid line surfaces of the hex configuration of the shank 38 (FIG. 2) of the bit 36 are shown in overlapping arrangement with intermediate portions of respective sides of the solid lines which represent the opening 34. The three solid lines, which represent the remaining three sides of the shank 38 are shown within the solid line representation of the opening 34. The dashed line circle in the center of FIG. 12 represents the groove 40 of the bit 36.

What is claimed is:

1. A power drivable chuck for receiving and clamping a shank having a cross section selected from the group consisting of a triangular cross section configuration and a hexagonal cross section configuration, which comprises:

a body having a front face;

a shank-receiving bore formed in the front face of the body and extending into the body from the front face;

the bore formed with three angularly interfacing surfaces arranged to drivingly engage the shank;

each surface of the three angularly interfacing surfaces being contiguous with the remaining two angularly interfacing surfaces; and means for locking the shank with the chuck.

2. The power drivable chuck as set forth in claim 1, which further comprises:

the three angularly interfacing surfaces of the bore forming three angularly interfacing walls arranged generally in a triangular cross sectional configuration.

3. The power drivable chuck as set forth in claim 1, which further comprises:

the body formed with a forward section of a prescribed length; and the bore extending from the front face and into the forward section for a distance less than the prescribed length.

4. The power drivable chuck as set forth in claim 1, which further comprises:

the body formed with a forward section having an exterior diameter.

5. The power drivable chuck as set forth in claim 1, wherein the means for locking comprises:

the body formed with an exterior surface;

a passage formed in the body and extending from the exterior surface to the bore;

a locking element movable within the passage and having a portion thereof which is extendable into the bore, an extension element assembled with and extending from the locking element, and means for normally urging the extension element, and thereby the locking element, into a position whereby the portion of the locking element extends normally into the bore.

6. The power drivable chuck as set forth in claim 5, wherein the locking element is a ball.

7. The power drivable chuck as set forth in claim 5, wherein the extension element comprises a pin and the means for normally urging comprises a spring in engagement with the pin.

8. The power drivable chuck as set forth in claim 7, wherein the means for normally urging further comprises:

a slot formed in the body which is in communication and aligned with the passage; and the pin located within the slot for movement therein.

9. The power drivable chuck as set forth in claim 8, which further comprises:

a base surface located adjacent the passage in a prescribed plane, the prescribed plane having a first side facing a major portion of the pin and a second side opposite the first side;

a first portion of the slot being located on the first side of the plane of the base surface;

the slot formed with a floor, at least a second portion of which extends through the plane and away from the second side thereof;

a first portion of the pin normally urged by the spring into engagement with the floor of the slot; and a second portion of the pin normally urged by the spring into engagement with the base surface on the first side of the plane thereof.

10. The power drivable chuck as set forth in claim 9, wherein the floor of the slot is located to preclude any urged movement of the pin beyond the floor to thereby establish the size of the portion of the locking element which extends normally into the bore.

11. The power drivable chuck as set forth in claim 9, which further comprises:

the locking element formed with a through hole; and the pin located within and extending from the through hole.

12. The power drivable chuck as set forth in claim 7, which further comprises:

a through hole formed in the locking element;

the pin having an intermediate portion located within the through hole and opposite end portions extending from opposite ends of the through hole.

13. The power drivable chuck as set forth in claim 9, which further comprises:

a sleeve positioned over the body for movement relative thereto; and a surface of the sleeve forming the base surface.

14. The power drivable chuck as set forth in claim 13, which further comprises:

the body formed with an intermediate section having a forward surface facing and spaced from the base surface of the sleeve;

a chamber defined between the base surface and the forward surface; and the spring located within the chamber.

15. A power drivable chuck for receiving and clamping a shank, which comprises:

a body having a shank-receiving bore formed therein and an exterior surface;

a passage formed in the body and extending from the exterior surface to the bore;

a locking element movable within the passage and having a portion thereof which is extendable into the bore, an extension element assembled with and extending from the locking element, and means for normally urging the extension element, and thereby the locking element, into a position whereby the portion of the locking element extends normally into the bore.

16. The power drivable chuck as set forth in claim 15, wherein the locking element is a ball.

17. The power drivable chuck as set forth in claim 15, wherein the extension element comprises a pin and the means for normally urging comprises a spring in engagement with the pin.

18. The power drivable chuck as set forth in claim 17, wherein the means for normally urging further comprises:

a slot formed in the body which is in communication and aligned with the passage; and the pin located within the slot for movement therein.

19. The power drivable chuck as set forth in claim 18, which further comprises:

a base surface located adjacent the passage in a prescribed plane, the prescribed plane having a first side facing a major portion of the pin and a second side opposite the first side;

a first portion of the slot being located on the first side of the plane of the base surface;

the slot formed with a floor, at least a second portion of which extends through the plane and away from the second side thereof;

a first portion of the pin normally urged by the spring into engagement with the floor of the slot; and a second portion of the pin normally urged by the spring into engagement with the base surface on the first side of the plane thereof.

20. The power drivable chuck as set forth in claim 19, wherein the floor of the slot is located to preclude any urged movement of the pin beyond the floor to thereby establish the size of the portion of the locking element which extends normally into the bore.

21. The power drivable chuck as set forth in claim 19, which further comprises:

the locking element formed with a through hole; and the pin located within and extending from the through hole.

22. The power drivable chuck as set forth in claim 17, which further comprises:

a through hole formed in the locking element;

the pin having an intermediate portion located within the through hole and opposite end portions extending from opposite ends of the through hole.

23. The power drivable chuck as set forth in claim 19, which further comprises:

a sleeve positioned over the body for movement relative thereto; and a surface of the sleeve forming the base surface.

24. The power drivable chuck as set forth in claim 23, which further comprises:

the body formed with an intermediate section having a forward surface facing and spaced from the base surface of the sleeve;

a chamber defined between the base surface and the forward surface; and the spring located within the chamber.

* * * * *